United States Patent [19]

Levine

[11] Patent Number: 4,759,520

[45] Date of Patent: Jul. 26, 1988

[54] FREE STANDING FOLDABLE PANEL STRUCTURE

[76] Inventor: Jason Levine, P.O. Box 35, Hermosa Beach, Calif. 90254

[21] Appl. No.: 31,851

[22] Filed: Mar. 30, 1987

[51] Int. Cl.[4] .............................................. F16M 11/00

[52] U.S. Cl. ...................................... 248/174; 40/539; 160/114; 160/135; 160/229.1; 211/199

[58] Field of Search ................ 248/174, 459; 211/198, 211/199, 73; 160/229 R, 135, 114, 351, 352; 40/539, 605

[56] References Cited

U.S. PATENT DOCUMENTS

| | | | |
|---|---|---|---|
| 1,734,782 | 11/1929 | Stam | 248/174 |
| 2,179,081 | 11/1939 | Bench, Jr. | 248/174 X |
| 2,677,469 | 5/1954 | Ebert | 248/459 X |
| 3,464,569 | 9/1969 | Downing | 248/174 X |
| 3,477,492 | 11/1969 | Suess | 160/351 X |
| 3,629,960 | 12/1971 | Roush | 108/27 X |
| 3,889,736 | 6/1975 | Firks | 160/229 R X |
| 4,045,897 | 9/1977 | Gates | 40/620 |
| 4,573,513 | 3/1986 | Small et al. | 160/351 X |

FOREIGN PATENT DOCUMENTS

| | | | |
|---|---|---|---|
| 953605 | 3/1964 | United Kingdom | 211/198 |

*Primary Examiner*—David L. Talbott

*Attorney, Agent, or Firm*—Edward A. Sokolski

[57] ABSTRACT

A free standing foldable panel structure has a plurality of panel sections which are foldably joined together along their edges. One of each pair of adjacent panel sections has a foldable tab at each end thereof these tabs being adapted to fit into slots formed in the adjacent panel in holding engagement therewith to set the adjacent panels in a predetermined angular position relative to each other. The mating panels can be readily assembled and disassembled and can be utilized as a display board, portable enclosure, etc.

4 Claims, 4 Drawing Sheets

FREE STANDING FOLDABLE PANEL STRUCTURE

This invention relates to a free standing foldable panel structure and more particularly to such a structure having panel sections which are set in predetermined angular positions relative to each other by means of interlocking tabs and slots on adjacent panel sections.

Portable free standing panel structures which can be readily assembled and disassembled have a number of practical uses such as for example as display boards, portable booths or enclosures, bulletin boards, etc. Such devices of the prior art generally involve foldable panel sections which can be set in a free standing condition on the ground. Such structures often do not have means for setting the panels in a predetermined angular relationship relative to each other such that once set in position, this angular position is retained. Without such interlocking means, the positions of the panels are subject to being changed relative to each other, displays contained thereon are readily subject to being disturbed, and the panels are subject to being readily inadvertently knocked over from their standing position.

Free standing prior art panel structures are described for example in U.S. Pat. No. 4,045,897 to Gates, U.S. Pat. No. 1,853,615 to Howard and U.S. Pat. No. 3,629,960 to Roush. In certain prior art devices such as that shown in U.S. Pat. No. 1,467,624 to Nash interlocking tongues and slots are employed to join portions of the structure together.

The device of the present invention is an improvement over such prior art free standing panel structures in which a simple yet highly effective interlocking tab and slot structure is employed to set adjacent hingedly attached panel sections in a predetermined relative angular position. The device of the present invention has the advantage of being rapidly and easily assemblable and disassemblable and yet affords a sturdy interlocking structure which holds its preset position.

The improvement is achieved in the present invention by employing a plurality of panel members which are joined together along their edges in a foldable or hinged relationship such that such panels can be folded flat against each other or adjusted angularly relative to each other. A pair of fold over tabs are provided along the opposite ends of the fold line on one of the panels while a pair of slots is formed opposite the fold line on an adjacent panel. The tabs are formed to have an arcuate structure which terminates in a stop member such that when the tabs are inserted in the opposing slots, the panels can be adjusted angularly relative to each other to a predetermined angular position whereat the stop members of the tabs abut against the wall of the slotted panel preventing further increasing angular movement and setting the two panels in the desired angular position.

It is therefore an object of this invention to provide a simple and highly economical free standing panel structure.

It is still a further object of this invention to provide a free standing panel structure in which adjacent panel members can be easily and rapidly set and retained in a predetermined angular position relative to each other.

Other objects of the invention will become apparent as the description proceeds in connection with the accompanying drawings of which:

Figure 1:
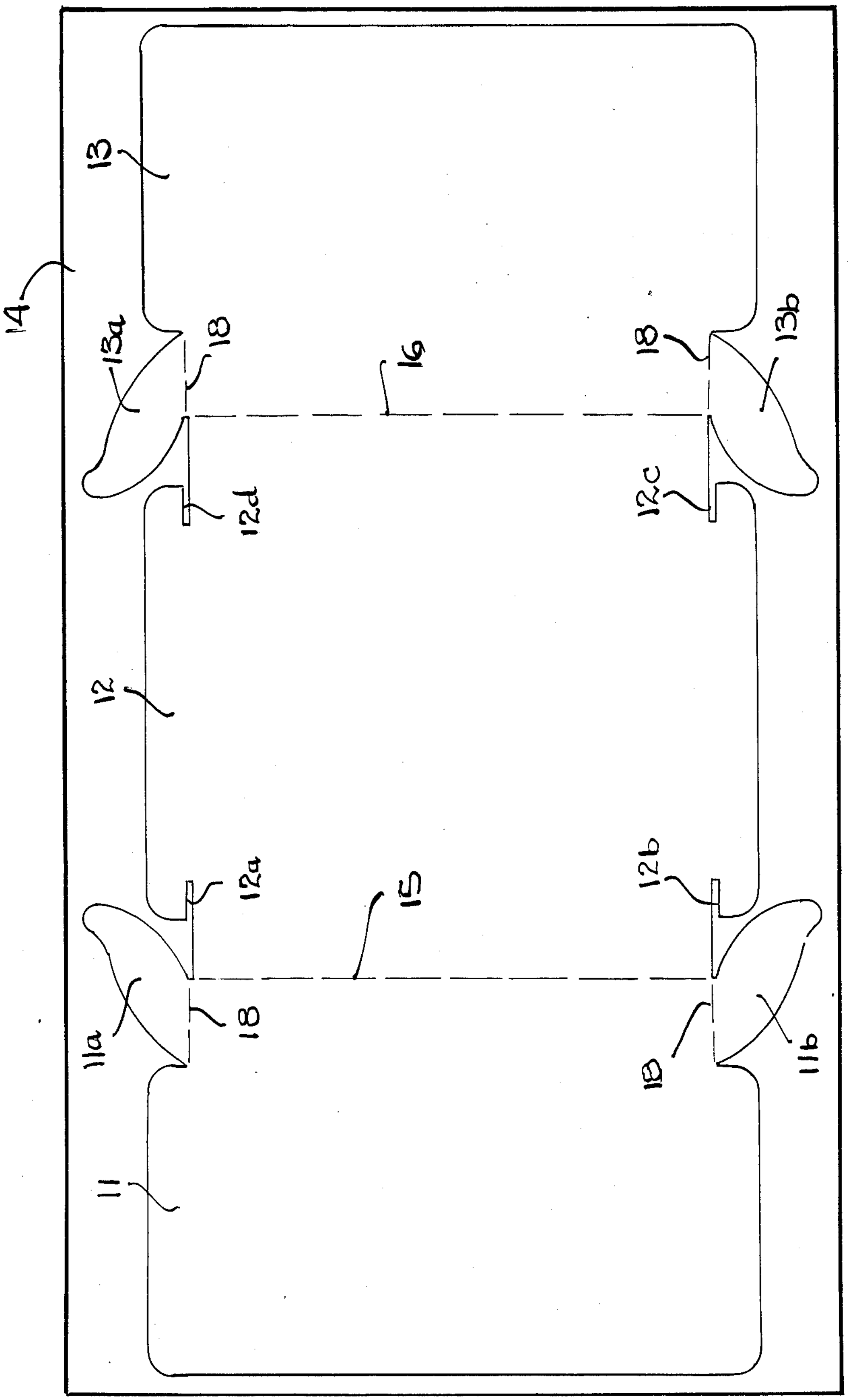
FIG. 1 is a top plan view illustrating a preferred embodiment of the invention in its stowed condition.
Figure 2:
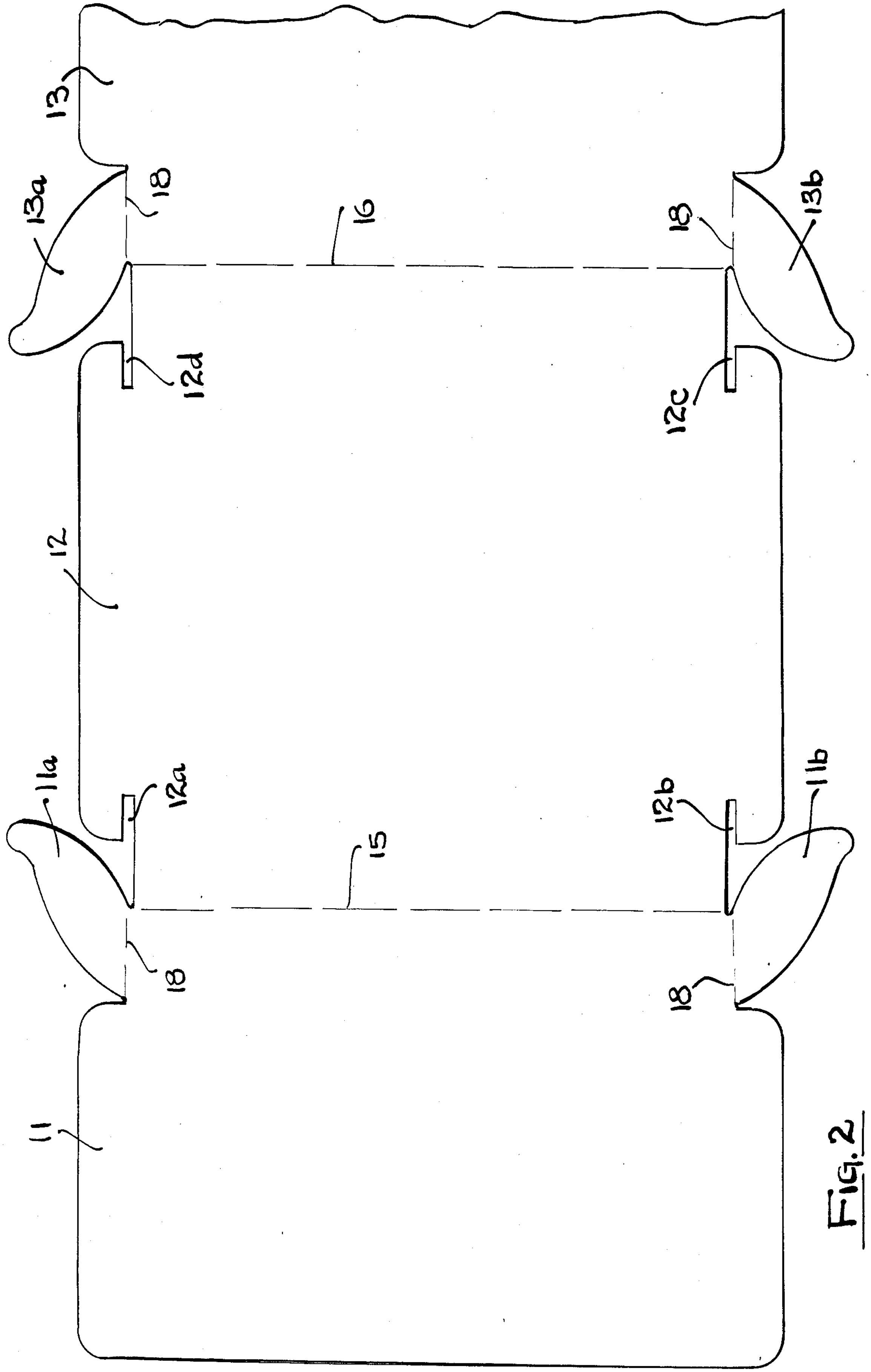
FIG. 2 is a top plan view illustrating the preferred embodiment ready for assembly.

Referring now to FIGS. 1 and 2 a preferred embodiment of the invention is shown in its stowed condition. Panels 11, 12 and 13 are punched out of a single piece of flat material 14 which may be of cardboard, fiberboard, plastic, corrugated board, plywood, metal etc. This makes a convenient way in which the device of the invention can be shipped or stowed prior to initial use. The panels join to each other along creased edges 15 and 16 and are foldable or hinged along these edges. In the case of nonbendable panels, these edges may be formed by suitable plastic hinging strips or even metal hinges. Formed at the top and bottom of each of panels 11 and 13 adjacent to and running normally from the ends of hinge or fold lines 15 and 16 are paired tabs **11*a*, 11*b* and 13*a*, 13*b* respectively. Slots 12*a*–12*d* are formed in central panel 12 opposite each of tabs 11*a*, 11*b*, 13*a* and 13*b*. The slots are preferably substantially equal in width to the thickness of the tabs which are inserted therein to assure a close fit to provide rigidity and stability to the panel structure when assembled. Tabs 11*a*, 11*b*, 13*a* and 13*b* have fold lines 18 where they extend from their respective panels which are parallel to slots 12*a*–12*d*,** such that the tabs an be folded over inwardly towards the observer as shown in the Figures.

Figure 3:
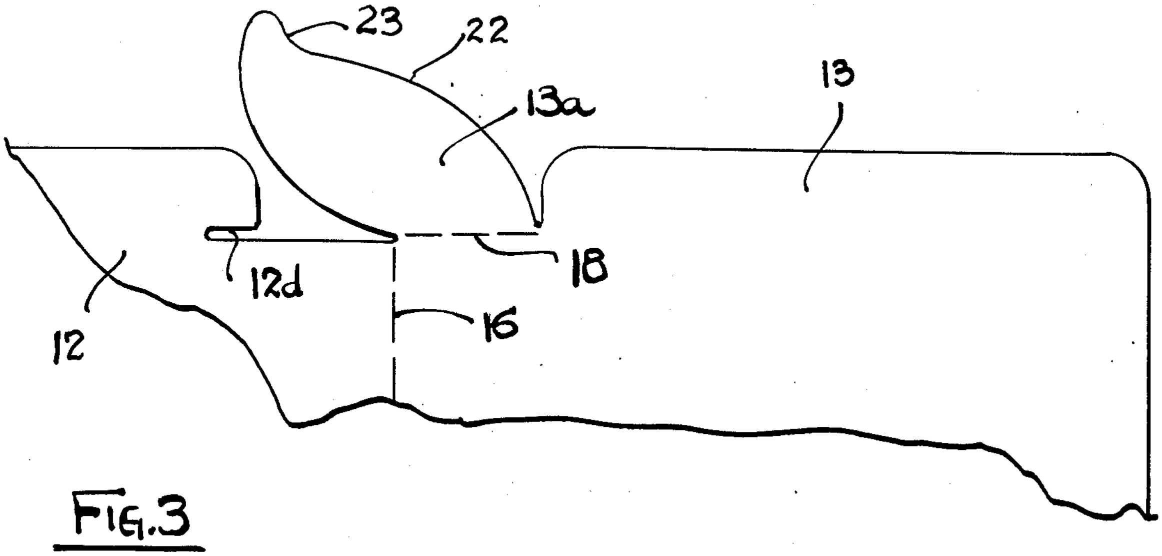
FIG. 3 is a sectional top plan view illustrating a tab member and a slot of a pair of adjacent panels.
Figure 4:
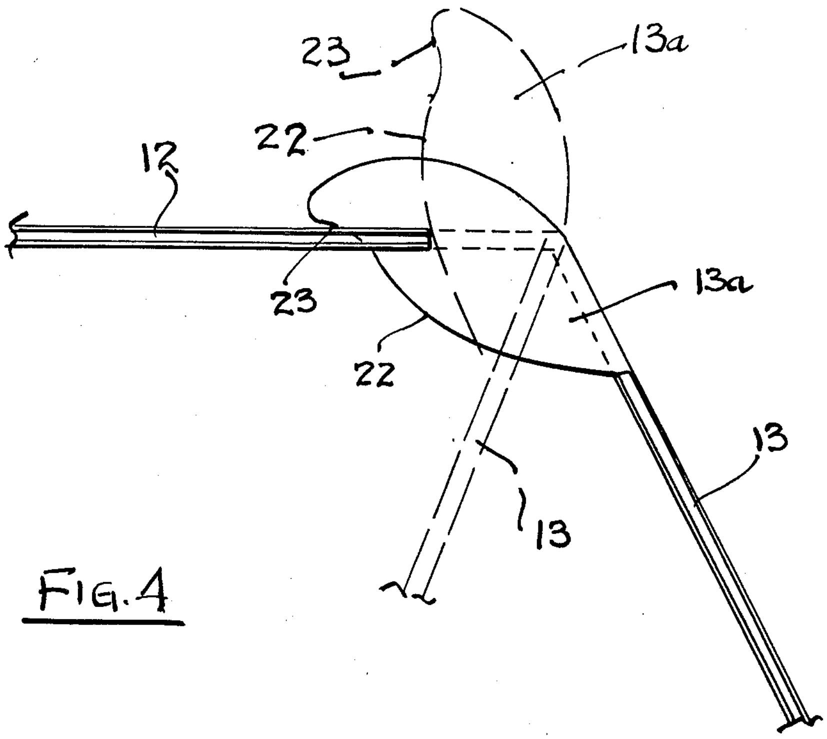
FIG. 4 is a view illustrating the assembly of the preferred embodiment.
Figure 5:
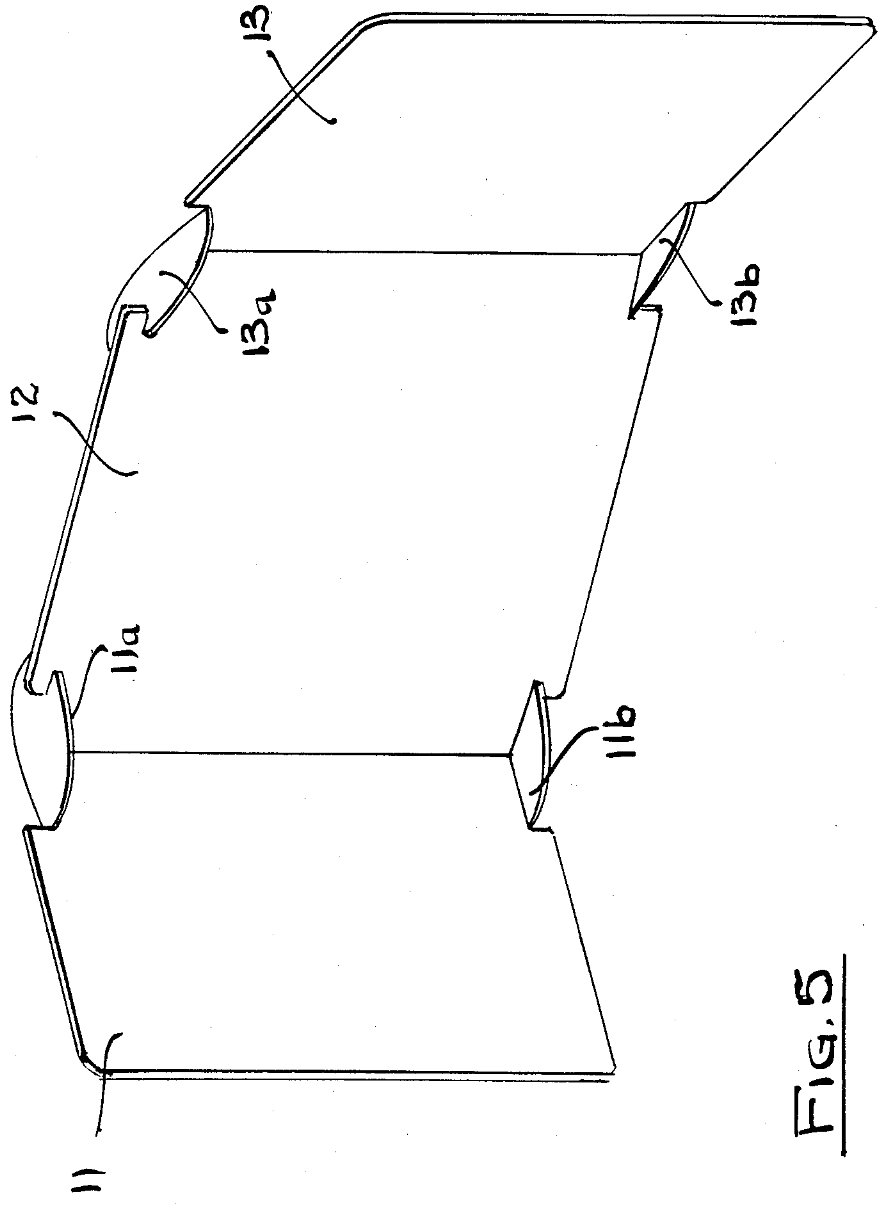
FIG. 5 is a perspective view illustrating the preferred embodiment in its assembled condition.

Referring now to FIGS. 3 and 4, the panels are assembled to the free standing position shown in FIG. 5 by first folding panels 11 and 13 inwardly towards panel 12 with all of the tabs in their upstanding position as shown in FIG. 3. With the panels in this inwardly folded condition, all of the tabs are folded along their fold lines 18 inwardly, towards the observer as looking at the figures. Panels 11 and 13 are then opened outwardly with the curved edges 22 of the tabs riding along the respective associated slot until stop members 23 at the ends of the tabs abut against the back wall of panel 12 which stops the travel of panels 11 and 13 relative to central panel 12 and thus fixes the angularity between the panels. In the illustrative embodiment, this angularity is set at 120–130 degrees. The curved surface 22 is adapted to ride along its associated slot to facilitate the opening of the panel, i.e. all of the tabs are fitted into the slots and once so fitted remain in the slots while the side panels are being opened to their final position. The device can be readily disassembled from its assembled position by folding the panels inwardly and raising the tabs to their upright position.

The free standing foldable panel structure of the invention can have a plurality of open sides (2, 3, 4, 5, etc.) or the sides can form an enclosure having a variety of different numbers of sides.

While the invention has been described and illustrated in detail, it is to be clearly understood that this is by way of illustration and example only, the spirit and scope of the invention being limited only to the terms of the following claims.

I claim:

1. A free standing foldable panel structure formed from a single rectangular piece of foldable board comprising:

a central panel having an inner and outer wall, said central panel further having laterally extending open ended slots in each corner thereof, a pair of end panels, there being a separate vertical edge line separating each of said end panels from the central panel, each of said end panels being foldable relative to the central panel along its associated edge line, said edge lines running substantially normal to said slots, a tab extending from the top and bottom corners of each of said end panels, said tabs having one of the ends thereof at the ends of the edge lines, said tabs having curved edges and stop members at the other of the ends thereof which are free, said tabs being bendable relative to the panel corners to a position whereat they extend in a direction substantially normal to the edge lines, said panels being adjustable to a predetermined angle relative to each other by inserting the curved edge of each tab of the end panels into an adjacent slot of the central panel and rotating the end panels outwardly relative to the central panel about the edge lines until the stop members of the tabs abut against the outer wall of the central panel.

2. The panel structure of claim 1 wherein said tabs have a thickness substantially equal to the width of the slots.

3. The foldable panel structure of claim 1 wherein said edge lines are formed by creased lines on an integral bendable board.

4. The foldable panel structure of claim 3 wherein the tabs are formed integrally with the board and have fold lines running substantially parallel to said slots.

* * * * *